US011223754B2

(12) United States Patent
Kao et al.

(10) Patent No.: US 11,223,754 B2
(45) Date of Patent: Jan. 11, 2022

(54) OPTICAL COMPONENT DRIVING MECHANISM

(71) Applicant: TDK TAIWAN CORP., Taoyuan (TW)

(72) Inventors: Kuo-Chun Kao, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 293 days.

(21) Appl. No.: 16/426,299

(22) Filed: May 30, 2019

(65) Prior Publication Data

US 2019/0369464 A1 Dec. 5, 2019

Related U.S. Application Data

(60) Provisional application No. 62/677,753, filed on May 30, 2018.

(30) Foreign Application Priority Data

May 8, 2019 (CN) .......................... 201920655246.0

(51) Int. Cl.
*H04N 5/225* (2006.01)
*G02B 27/64* (2006.01)
*G03B 5/00* (2021.01)
*G02B 7/00* (2021.01)

(52) U.S. Cl.
CPC ......... *H04N 5/2254* (2013.01); *G02B 27/646* (2013.01); *G03B 5/00* (2013.01); *G02B 7/005* (2013.01); *G03B 2205/0007* (2013.01); *G03B 2205/0069* (2013.01)

(58) Field of Classification Search
CPC .................................................. G02B 27/646
See application file for complete search history.

(56) References Cited

U.S. PATENT DOCUMENTS

| 9,071,743 | B2 * | 6/2015 | Yeo ........................ G03B 13/34 |
| 9,225,886 | B2 * | 12/2015 | Yeo ....................... H04N 5/2252 |
| 9,341,860 | B2 * | 5/2016 | Wu ........................ G02B 27/646 |
| 9,547,148 | B2 * | 1/2017 | Hagiwara ................ G02B 7/09 |
| 9,568,743 | B2 * | 2/2017 | Hayashi ............. H04N 5/22521 |
| 10,142,527 | B2 * | 11/2018 | Kang ................... H04N 5/2257 |

(Continued)

*Primary Examiner* — Clayton E. LaBalle
*Assistant Examiner* — Leon W Rhodes, Jr.
(74) *Attorney, Agent, or Firm* — Muncy, Geissler, Olds and Lowe, P.C.

(57) ABSTRACT

An optical component driving mechanism includes a holder, a frame, a casing, a base, a first elastic member, a second elastic member and a driving assembly. The holder is for holding an optical component. The frame is elastically connected to the holder. The base is fixedly connected to the casing. The first elastic member has a first outer connecting portion and a first inner connecting portion. The second elastic member has a second outer connecting portion and a second inner connecting portion. The driving assembly is configured to drive the holder to move relative to the frame. The first and second outer connecting portions are disposed on the frame, the first and second inner connecting portions are disposed on the holder, and there is no elastic member disposed between the holder and the base for connecting the base or the frame.

20 Claims, 16 Drawing Sheets

(56) References Cited

U.S. PATENT DOCUMENTS

2011/0262122 A1* 10/2011 Minamisawa ........... G03B 5/00
396/55
2019/0170967 A1* 6/2019 Jung ...................... G02B 7/105
2020/0084348 A1* 3/2020 Zhang ...................... G02B 7/08

* cited by examiner

OPTICAL COMPONENT DRIVING MECHANISM

CROSS REFERENCE TO RELATED APPLICATIONS

This application claims the benefit of U.S. Provisional Application No. 62/677,753, filed May 30, 2018, and China Patent Application No. 201920655246.0, filed May 8, 2019, the entirety of which are incorporated by reference herein.

BACKGROUND OF THE INVENTION

Field of the Invention

The application relates an optical component driving mechanism, and more particularly to an optical component driving mechanism that includes a single spring sheet.

Description of the Related Art

As technology has progressed, many kinds of electronic devices such as smartphones have begun to include the functionality of digital photography or video recording. A user can operate the electronic device to capture various images.

In general, the camera module includes an optical component driving mechanism and has the functions of auto focusing or optical image stabilization (OIS). The optical component driving mechanism can include a holder, two elastic members, a frame and a base, and the holder is suspended in the frame by the elastic members and can move relative to the base, so as to achieve the purpose of auto focusing. However, the elastic members occupy the internal space of the optical component driving mechanism, so that the thickness of the optical component driving mechanism cannot be further reduced when it is required to reduce the thickness of the electronic device for the purpose of miniaturization.

Therefore, how to prevent the elastic members from taking up too much space inside the optical component driving mechanism and how to reduce the thickness of the optical component driving mechanism is a topic nowadays that needs to be discussed and solved.

BRIEF SUMMARY OF INVENTION

Accordingly, one objective of the present disclosure is to provide an optical component driving mechanism to solve the above problems.

According to some embodiments of the disclosure, an optical component driving mechanism is provided and includes a holder, a frame, a casing, a base, a first elastic member, a second elastic member and a driving assembly. The holder is for holding an optical component. The frame is elastically connected to the holder. The casing has a top wall and a side wall, and the side wall extends from the top wall along an optical axis of the optical component. The base is fixedly connected to the casing. The first elastic member has a first outer connecting portion, a first inner connecting portion and a first elastic portion, and the first elastic portion is connected to the first outer connecting portion and the first inner connecting portion. The second elastic member has a second outer connecting portion, a second inner connecting portion and a second elastic portion, and the second elastic portion is connected to the second outer connecting portion and the second inner connecting portion. The driving assembly is configured to drive the holder to move relative to the frame. The first elastic member is electrically independent from the second elastic members. The first and second outer connecting portions are disposed on the frame and face the top wall, the first and second inner connecting portions are disposed on the holder and face the top wall, and there is no elastic member disposed between the holder and the base for connecting the base or the frame.

According to some embodiments, the first elastic portion has a first elastic coefficient which is defined as a force required to cause deformation per unit length along a direction of the optical axis, and the second elastic portion has a second elastic coefficient which is defined as a force required to cause deformation per unit length along a direction perpendicular to the optical axis. The second elastic coefficient is at least 20 times the first elastic coefficient.

According to some embodiments, the optical component sequentially defines a first portion, a second portion, and a third portion with the same length along the optical axis, and when viewed in a direction perpendicular to the optical axis, the first elastic member and second elastic member partially overlap the second portion.

According to some embodiments, the optical component sequentially defines a first part, a second part, a third part, a fourth part and a fifth part with the same length along the optical axis, and when viewed along a direction perpendicular to the optical axis, the first elastic member and second elastic member partially overlap the third part.

According to some embodiments, the driving assembly drives the holder to move along the optical axis.

According to some embodiments, the first outer connecting portion and the second outer connecting portion are located on the same plane.

According to some embodiments, the first inner connecting portion and the second inner connecting portion are located on the same plane.

According to some embodiments, the first elastic portion and the second elastic portion each has a long strip-shaped structure, and a thickness of the first elastic portion or a thickness of the second elastic portion along the optical axis is greater than 0.04 mm.

According to some embodiments, a width of the first elastic portion and a width of the second elastic portion is each greater than 0.048 mm.

According to some embodiments, a total height of the optical component driving mechanism is less than 3 mm.

According to some embodiments, the holder defines an upper half portion and a lower half portion with a same height along the optical axis, and the driving assembly includes a driving coil disposed in the lower half portion, wherein the lower half portion is closer to the base than the upper half portion.

According to some embodiments, the frame has a groove facing the base, and the groove is configured to receive a portion of the driving assembly.

According to some embodiments, the first elastic portion and the second elastic portion partially overlap the frame when viewed along the optical axis.

According to some embodiments, the frame has a plurality of avoiding grooves facing the top wall and corresponds to a portion of the first elastic portion and a portion of the second elastic portion.

According to some embodiments, the avoiding grooves do not overlap the first outer connecting portion and the second outer connecting portion when viewed along the optical axis.

According to some embodiments, the casing has a rectangular-shaped structure, the first elastic portion and the second elastic portion correspond to the side wall, and a length of the first elastic portion or a length of the second elastic portion is at least one third of a length of the side wall.

According to some embodiments, the frame, the driving assembly and the holder face the base, and there is no flat elastic member between the base and the frame, between the base and the driving assembly and between the base and the holder.

According to some embodiments of the disclosure, the holder has an opening, and the optical component driving mechanism further includes a sensing component corresponding to the opening, and the sensing component is received in the opening when the holder moves along the optical axis.

According to some embodiments, a plurality of limiting portions is respectively formed on a top surface and a bottom surface of the holder and is extended along the optical axis.

According to some embodiments, the frame has a recess portion, and a portion of the limiting portion on the top surface is located within the recess portion for limiting rotation of the holder.

The present disclosure provides an optical component driving mechanism configured to drive a holder and the optical component to move relative to the base, and the optical component driving mechanism has only a single spring sheet configured to connect the holder and the frame. Because the optical component driving mechanism only provide one single spring sheet, the overall height of the optical component driving mechanism can be reduced so as to achieve the purpose of miniaturization.

In addition, in some embodiments, the center of gravity of the spring sheet is closer to the center of gravity of the optical component, so that the stability of the optical component driving mechanism can be improved during operation. Furthermore, the spring sheet has a first elastic coefficient and a second elastic coefficient, and the second elastic coefficient is at least 20 times greater than the first elastic coefficient. Based on this structural design, the spring sheet can support the holder more effectively, and the spring sheet can be prevented from breaking, so as to ensure that the optical component driving mechanism can be operated normally.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF INVENTION

Figure 1:
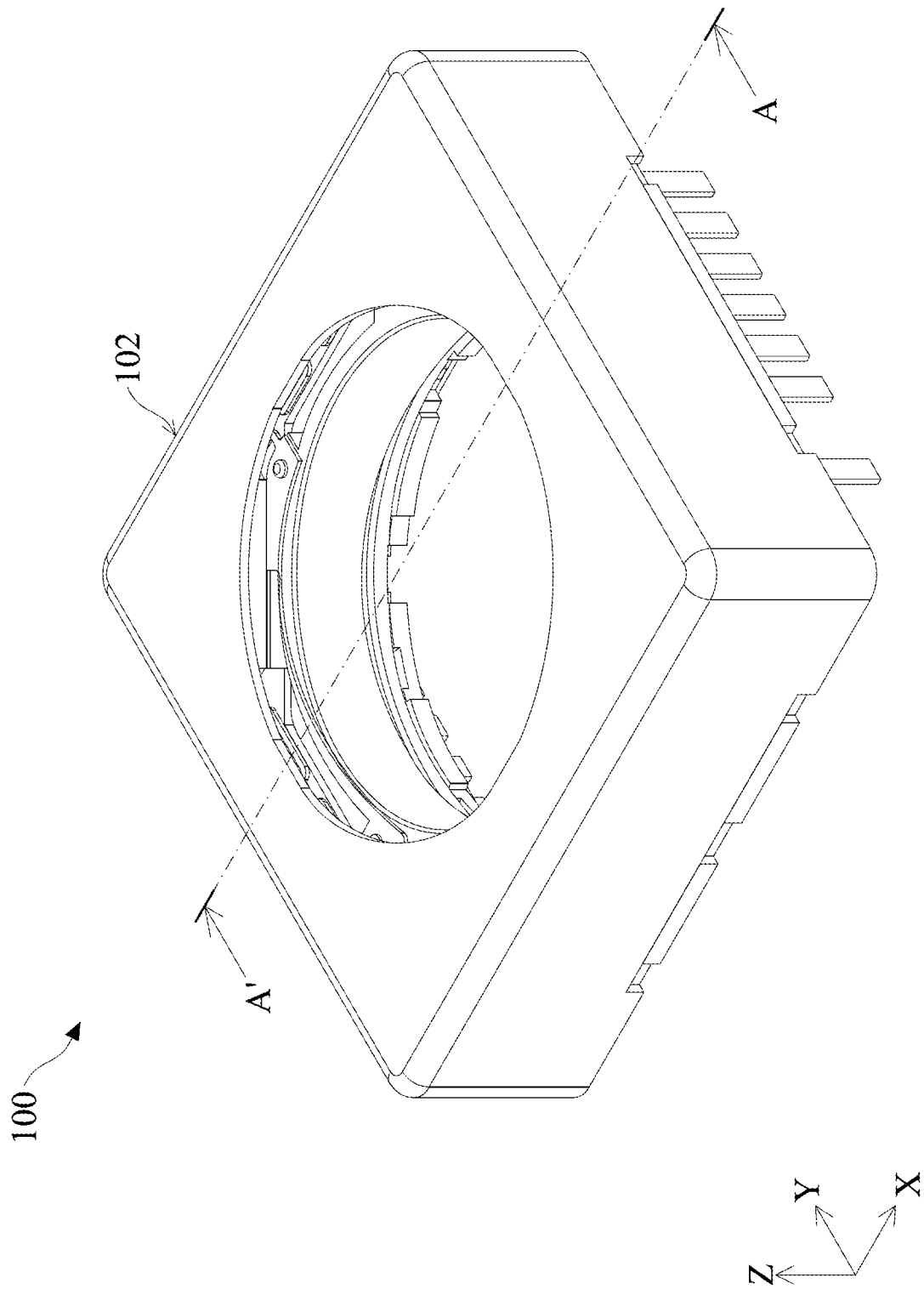
FIG. 1 is a schematic diagram of an optical component driving mechanism according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
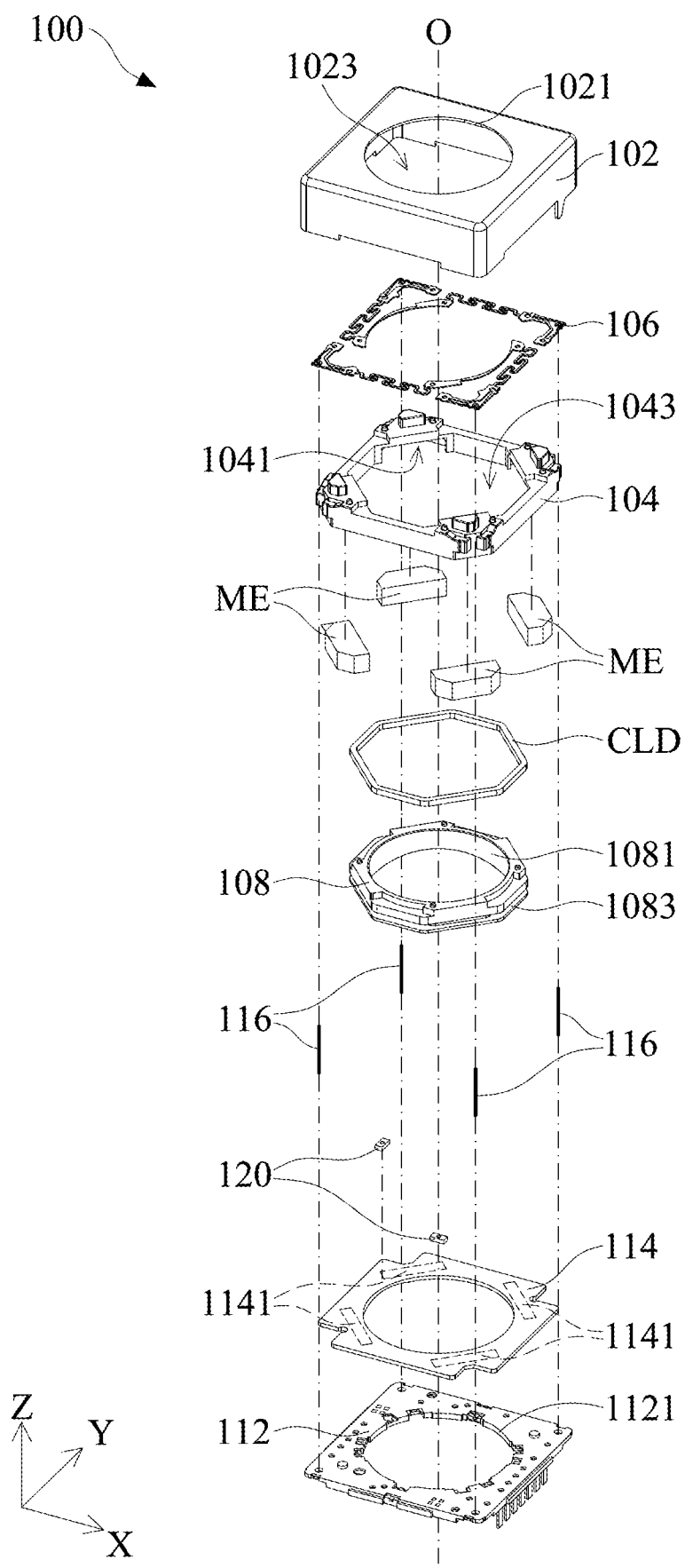
FIG. 2 is an exploded diagram of the optical component driving mechanism according to an embodiment of the present disclosure.
Figure 3:
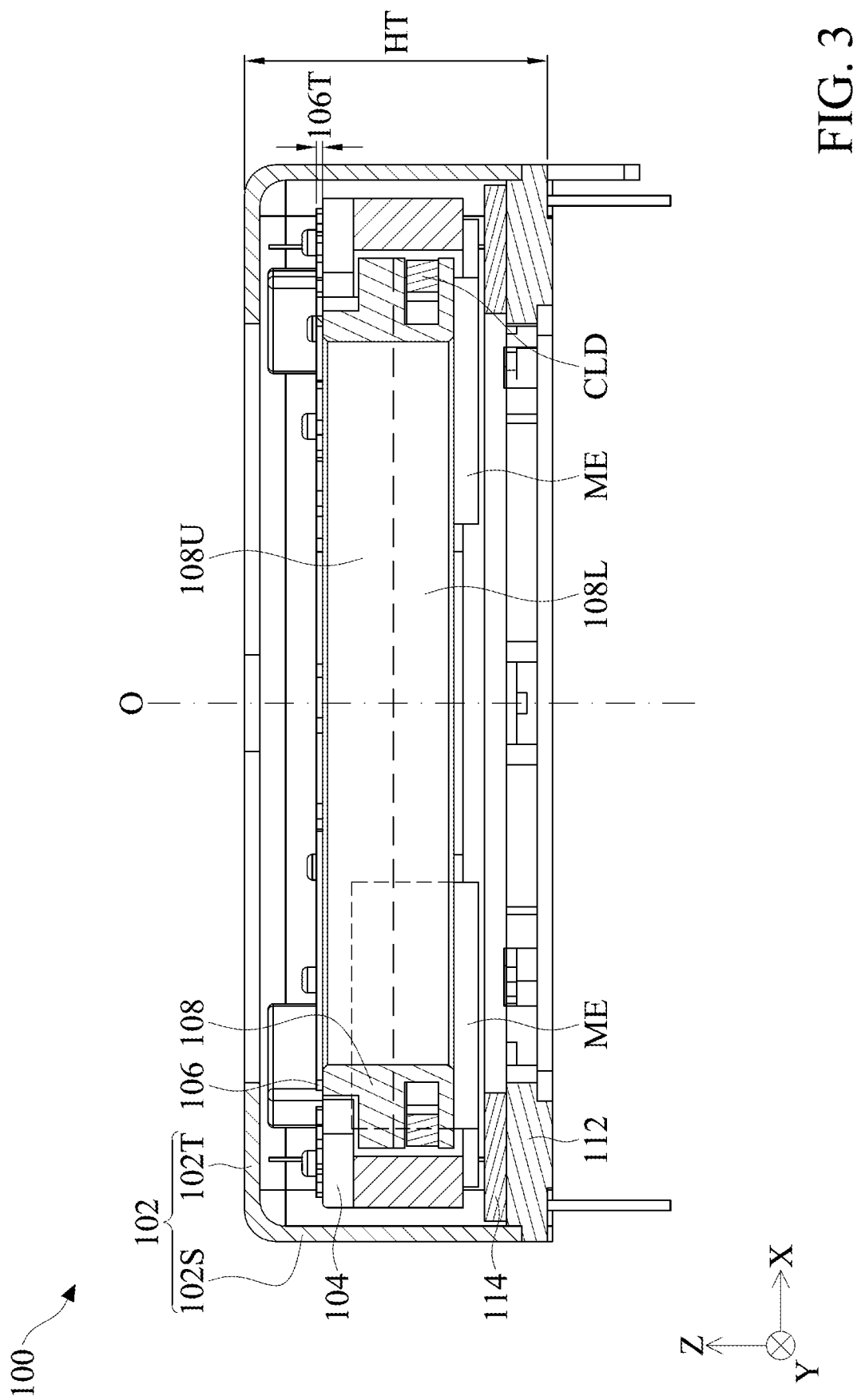
FIG. 3 is a cross-sectional view along line A-A' in FIG. 1.

Please refer to FIG. 1 to FIG. 3. FIG. 1 is a schematic diagram of an optical component driving mechanism 100 according to an embodiment of the present disclosure. FIG. 2 is an exploded diagram of the optical component driving mechanism 100 according to an embodiment of the present disclosure. FIG. 3 is a cross-sectional view along line A-A' in FIG. 1. As shown in FIG. 2, the optical component driving mechanism 100 includes a casing 102, a frame 104, a spring sheet 106, a holder 108, a driving assembly (including a driving coil CLD and four magnetic components ME), a base 112 and a circuit board 114 (including four induction coils 1141). The driving assembly may also include the induction coils 1141.

The casing 102 has a hollow structure, and a casing opening 1021 is formed on the casing 102. A base opening 1121 is formed on the base 112. The center of the casing opening 1021 corresponds to an optical axis O of an optical component (not shown in the figures) which is held by the holder 108. The base opening 1121 corresponds to an image sensing element (now shown in the figures) disposed below the base 112. The casing 102 is fixedly connected to the base 112 and can include an accommodating space 1023 for accommodating the frame 104, the spring sheet 106, the holder 108, the driving coil CLD, the circuit board 114 and the magnetic components ME.

As shown in FIG. 2, the holder 108 has a hollow ring structure, and the holder 108 has a through hole 1081. The through hole 1081 forms a threaded structure (not shown) corresponding to another threaded structure (not shown) on the optical component, such that the optical component can be locked in the through hole 1081. In this embodiment, the driving coil CLD surrounds the holder 108. In addition, the frame 104 has a plurality of grooves 1041 and a central opening 1043. In this embodiment, the frame 104 has four grooves 1041 formed toward the base 112 for accommodating the four magnetic components ME, but the amounts of the grooves 1041 and the magnetic components ME are not limited thereto. The holder 108 and the aforementioned optical component are disposed in the central opening 1043 and are movable relative to the frame 104.

Specifically, as shown in FIG. 3, the holder 108 can be connected to the frame 104 through the spring sheet 106 to be suspended within the central opening 1043. When the driving coil CLD is provided with electricity, the four magnetic components ME act with the driving coil CLD to generate an electromagnetic driving force, thereby driving the holder 108 to move along the optical axis O (the Z-axis direction) relative to the frame 104, so as to perform the function of auto focus (Auto Focusing).

In addition, as shown in FIG. 2, the optical component driving mechanism 100 further includes four resilient members 116. Each of the resilient members 116 has a long strip-shaped structure, such as a column-shaped structure or a line-shaped structure, but the shape is not limited thereto. In this embodiment, one end of the resilient member 116 is connected to the spring sheet 106, and the other end of the resilient member 116 is connected to the base 112 and is electrically connected to the circuit board 114. Based on the structural configuration, the holder 108 with the optical component (not shown in the figures) and the frame 104 can move relative to the base 112 along the X-Y plane through the four flexible resilient members 116.

As shown in FIG. 2, the induction coils 1141 are disposed corresponding to the positions of the magnetic components ME. When the induction coils 1141 are provided with electricity and act with the corresponding magnetic components ME, an electromagnetic driving force is generated to drive the holder 108 and the optical component to move along the Y-axis direction or the X-axis direction. As a result, when the optical component driving mechanism 100 is shaken, the holder 108 can be driven by the electromagnetic force to move along the X-Y plane, so as to achieve the purpose of optical image stabilization (OIS).

In addition, in one embodiment, the optical component driving mechanism 100 may further include two first sensing components 120 which are electrically connected to the circuit board 114 and are configured to sense the movement of the holder 108 along the X-Y plane.

As shown in FIG. 3, light is projected along the optical axis O from a light incident end into the optical component driving mechanism 100 to a light exiting end. The base 112 is closer to the light exiting end than the casing 102. In addition, as shown in FIG. 3, the casing 102 has a top wall 102T and a side wall 102S, and the side wall 102S is extended from the top wall 102T along the optical axis O. It should be noted that, in compare to the conventional optical component driving mechanism, the optical component driving mechanism 100 of the present disclosure only has one single spring sheet, and thus has a small total height HT. Moreover, in this embodiment, the total height HT is less than 3.0 mm.

Based on this structural design, the overall internal structure can be simplified, the manufacturing cost can be reduced, and the production process can be shortened for the purpose of miniaturization. In addition, based on this structural design, the center of gravity of the spring sheet 106 can be closer to the center of gravity of the optical component, thereby improving stability of operation.

In this embodiment, no elastic member is disposed between the holder 108 and the base 112 to be connected to the base 112 or the frame 104. In particular, the frame 104, the magnetic components ME, and the holder 108 face the base 112, and there is no elastic member, such as a flat elastic member, disposed between the base 112 and the frame 104, between the base 112 and the magnetic components ME and between the base 112 and the holder 108. In other embodiments, the spring sheet 106 can also be disposed under the holder 108 and is configured to connect the frame 104 (or the base 112) to the holder 108.

In addition, as shown in FIG. 3, the holder 108 defines an upper half portion 108U and a lower half portion 108L with the same height along the optical axis O, and the driving coil CLD is disposed in the lower half portion 108L. The lower half portion 108L is closer to the base 112 than the upper half portion 108U. Because the driving coil CLD is closer to the center of the magnetic component ME in the direction of the optical axis O, the ability of the driving assembly to drive the holder 108 can be improved. That is, the movable range of the holder 108 can be increased, thereby increasing the focus range of an image generated by the optical component driving mechanism 100 to enhance the focus performance.

Figure 4:
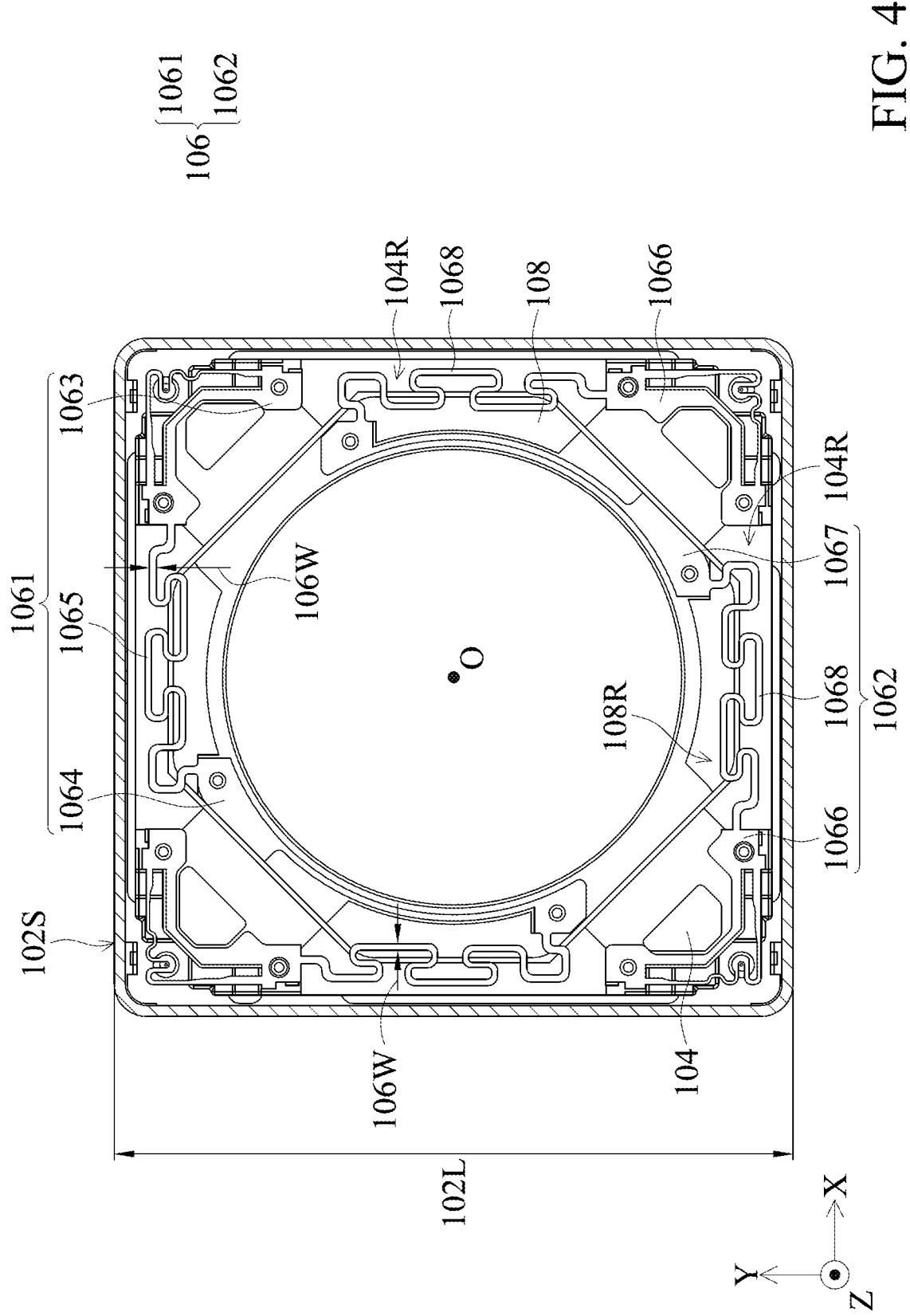
FIG. 4 is a top view of the casing, the frame and the spring sheet according to an embodiment of the present disclosure.

Please refer to FIG. 3 and FIG. 4 together. FIG. 4 is a top view of the casing 102, the frame 104 and the spring sheet 106 according to an embodiment of the present disclosure.

As shown in FIG. 4, the spring sheet 106 may include a first elastic member 1061 and a second elastic member 1062. The first elastic member has a first outer connecting portion 1063, a first inner connecting portion 1064 and a first elastic portion 1065, and the first elastic portion 1065 is connected to the first outer connecting portion 1063 and the first inner connecting portion 1064. Furthermore, the second elastic member 1062 has a second outer connecting portion 1066, a second inner connecting portion 1067 and a second elastic portion 1068. The second elastic portion 1068 is connected to the second outer connecting portion 1066 and the second inner connecting portion 1067.

As shown in FIG. 4, the first elastic member 1061 is electrically independent from the second elastic member 1062, the first outer connecting portion 1063 and the second outer connecting portion 1066 are disposed on the frame 104 and face the top wall 102T (FIG. 3), and the first inner connecting portion 1064 and the second inner connecting portion 1067 are disposed on the holder 108 and face the top wall 102T.

As shown in FIG. 4, when viewed along the direction of the optical axis O, the first elastic portion 1065 and the second elastic portion 1068 partially overlap the frame 104, the first outer connecting portion 1063 and the second outer connecting portion 1066 are located on the same plane, and the first inner connecting portion 1064 and the second inner connecting portion 1067 are located on the same plane, so that the first elastic member 1061 and the second elastic member 1062 do not have a preload.

In an embodiment, the frame 104 has four avoiding grooves 104R disposed toward the top wall 102T and corresponding to a portion of the first elastic portion 1065 and a portion of the second elastic portion 1068, so that during the movement of the holder 108, these first elastic portions 1065 and the second elastic portions 1068 do not collide with the frame 104. When viewed in the direction of the optical axis O, the avoiding grooves 104R do not overlap the first outer connecting portion 1063 and the second outer connecting portion 1066.

Furthermore, in this embodiment, the holder 108 can also have four avoiding grooves 108R corresponding to the first elastic portion 1065 and the second elastic portion 1068, so that during the movement of the holder 108, these first elastic portions 1065 and the second elastic portions 1068 do not collide with the holder 108. Based on the above structural design, the space for disposing the elastic member can be increased, and the flexibility of the design can be improved.

In addition, as shown in FIG. 4, the casing 102 has a rectangular-shaped structure (only the side wall 102S is shown in FIG. 4), and the first elastic portion 1065 and the second elastic portion 1068 correspond to the side wall 102S. In this embodiment, the length of the first elastic portion 1065 or the length of the second elastic portion 1068 is at least one third of a length 102L of the side wall 102S, so that the problem of stress concentration resulting in damage of the spring sheet 106 can be avoided.

In this embodiment, each of the first elastic portion 1065 and the second elastic portion 1068 has a long strip-shaped structure, and a thickness 106T along the optical axis O is greater than 0.04 mm (FIG. 3). In addition, a width 106W (in the X-axis direction or the Y-axis direction) of the first elastic portion 1065 or the second elastic portion 1068 is greater than 0.048 mm. Based on this structural design, the structural strength of the spring sheet 106 can be increased. It should be noted that the thickness 106T of the spring sheet 106 of the present disclosure is still smaller than the total thickness of the two conventional spring sheets, so that the miniaturization can be effectively achieved.

In an embodiment, the first elastic portion 1065 has a first elastic coefficient defined as a force required to cause deformation per unit length along the direction of the optical axis O and the second elastic portion has a second elastic coefficient which is defined as a force to be applied causing deformation per unit length in the direction perpendicular to the optical axis O, and the second elastic coefficient is at least 20 times the first elastic coefficient. Based on this structural design, the spring sheet 106 can support the holder 108 more effectively, and the spring 106 can be prevented from breaking, so as to ensure that the optical component driving mechanism 100 can operate normally.

Figure 5:
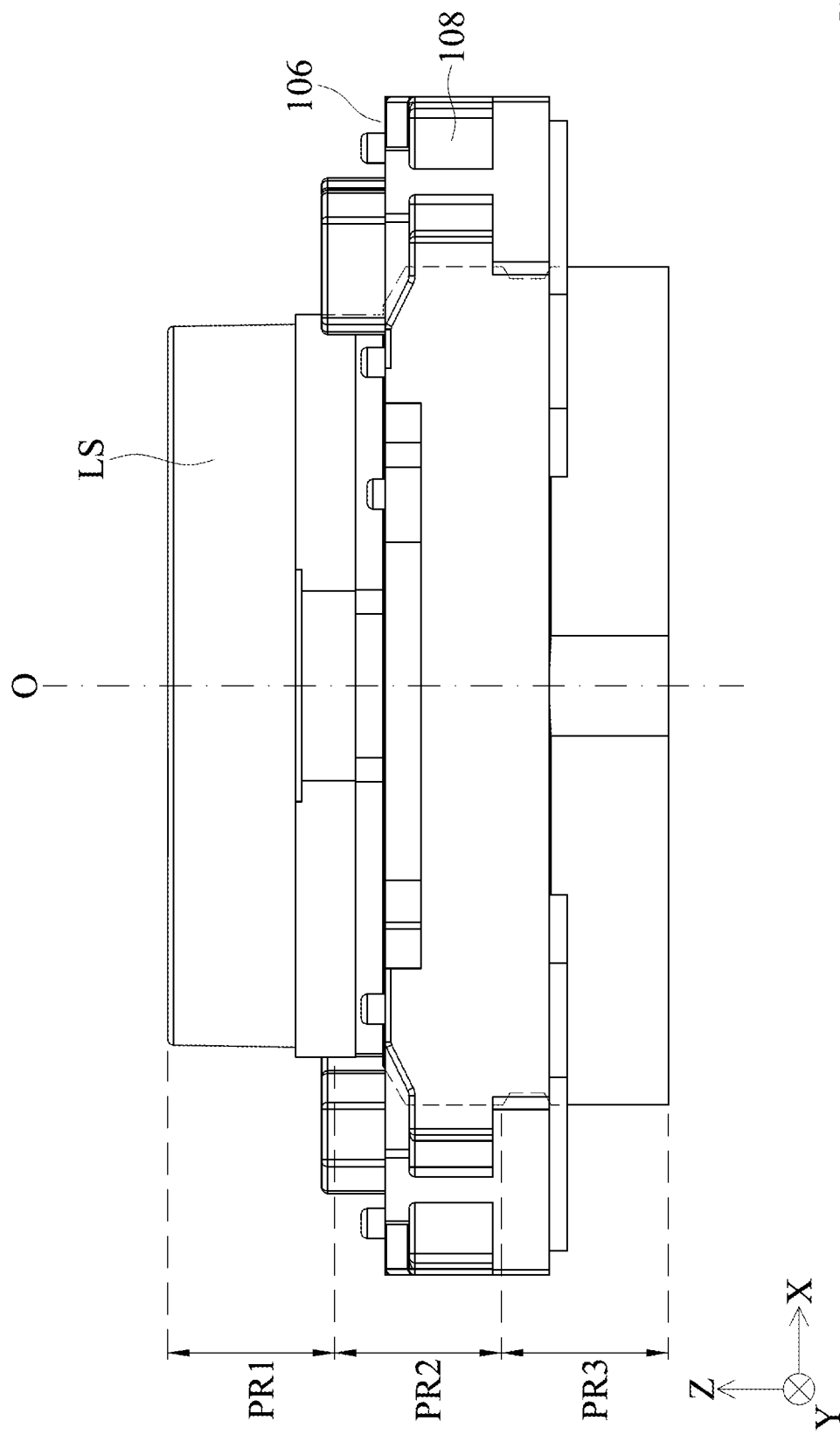
FIG. 5 is a schematic diagram of the spring sheet, the holder and an optical component according to an embodiment of the present disclosure.

Please refer to FIG. 5, which is a schematic diagram of the spring sheet 106, the holder 108 and an optical component LS according to an embodiment of the present disclosure. As shown in FIG. 5, when viewed in a direction perpendicular to the optical axis O, the optical component LS may sequentially define a first portion PR1, a second portion PR2 and a three portion PR3 with the same length along the optical axis O, and the spring sheet 106 (including the first elastic member 1061 and the second elastic member 1062 described above) partially overlaps the second portion PR2. Based on this structural design, the center (the center of gravity) of the spring sheet 106 is closer to the center (the center of gravity) of the optical component LS so as to improve the stability of operation of the optical component driving mechanism 100.

Figure 6:
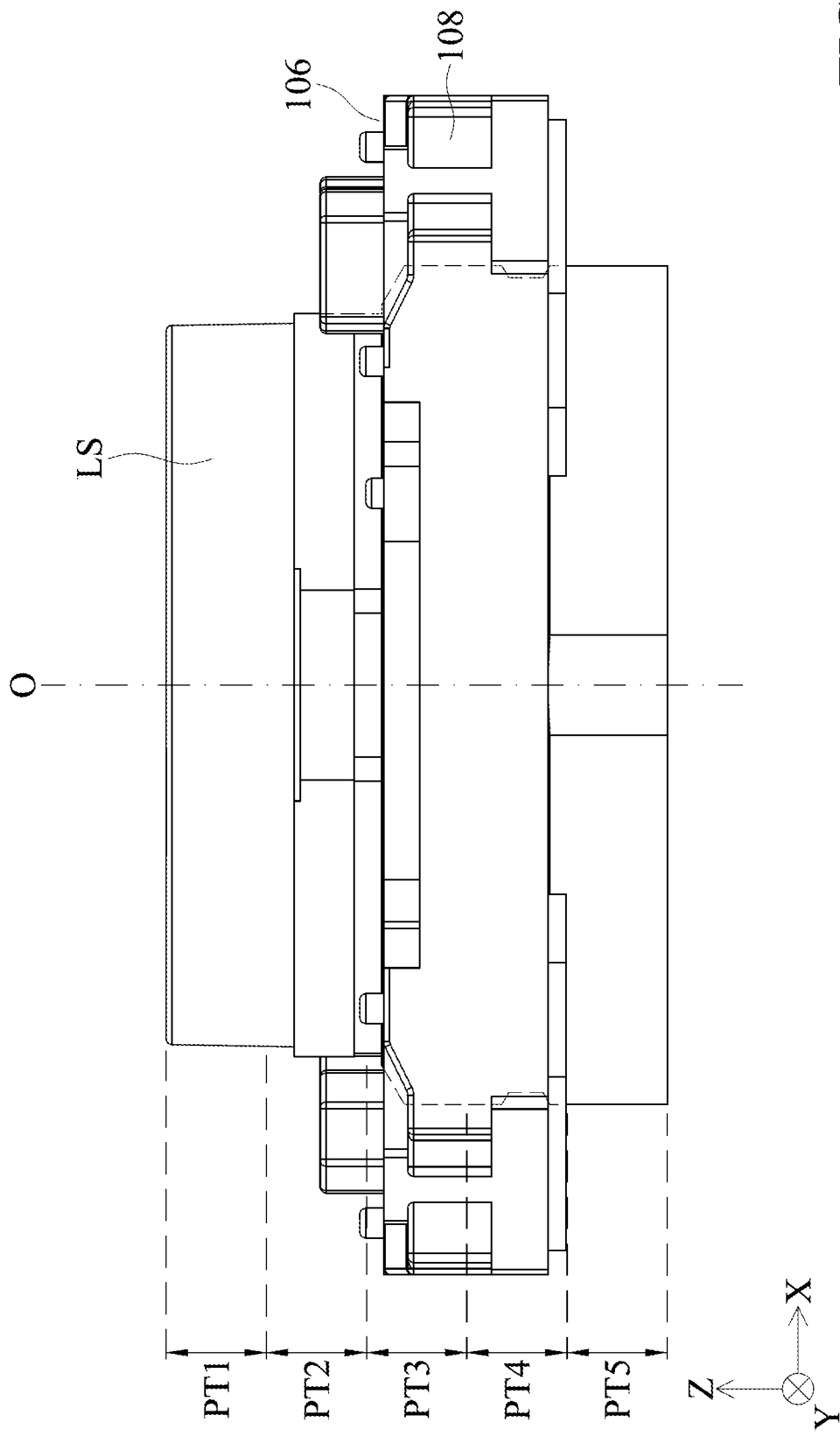
FIG. 6 is a schematic diagram of the spring sheet, the holder and the optical component according to another embodiment of the present disclosure.

Please refer to FIG. 6, which is a schematic diagram of the spring sheet 106, the holder 108 and the optical component LS according to another embodiment of the present disclosure. As shown in FIG. 6, when viewed along a direction perpendicular to the optical axis O, the optical component LS sequentially defines a first part PT1, a second part PT2, a third part PT3, the fourth part PT4 and the fifth part PT5 with the same length along the optical axis O, and the spring sheet 106 (including the first elastic member 1061 and the second elastic member 1062) partially overlaps the third part PR3.

Figure 7:
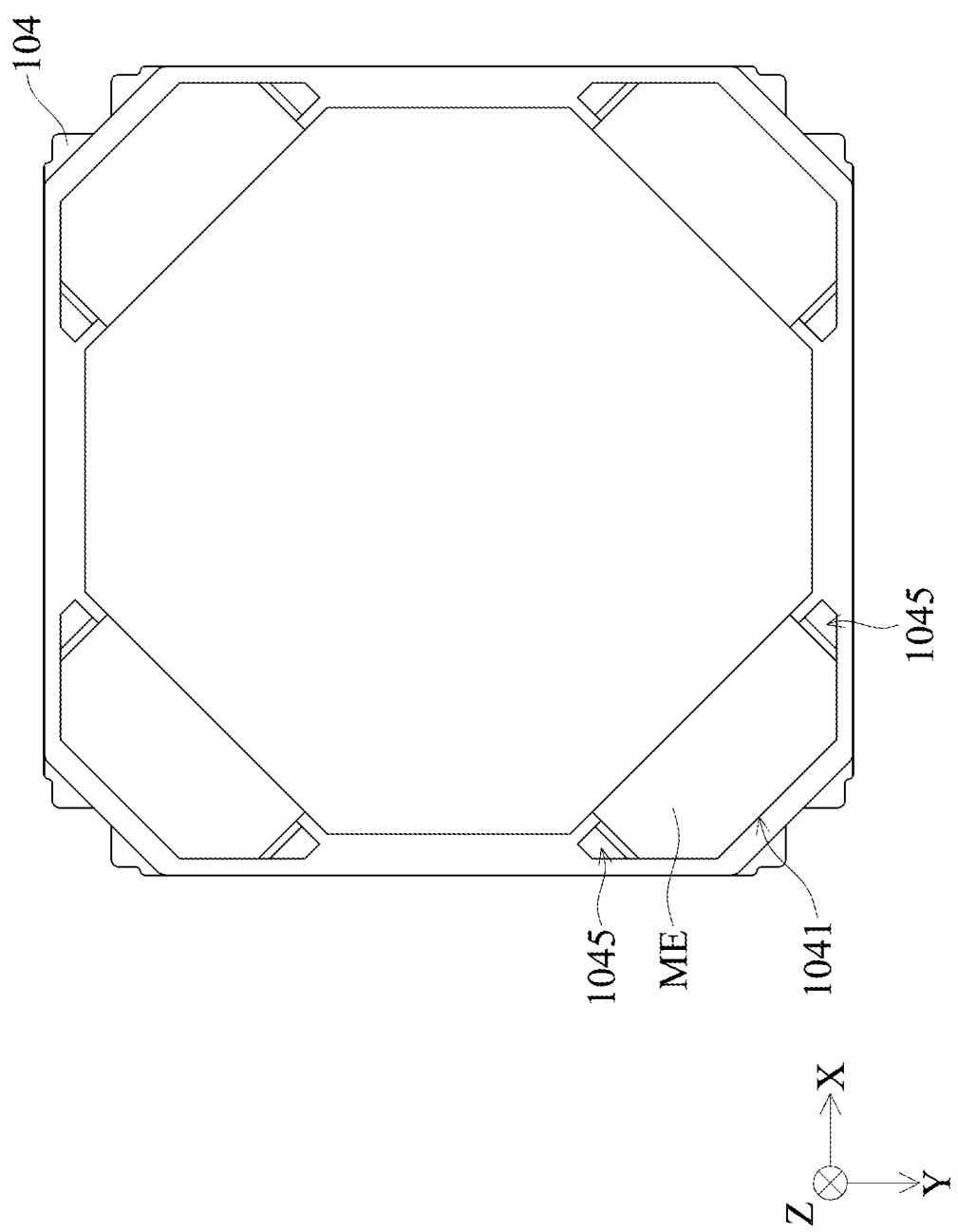
FIG. 7 is a bottom view of the frame and the magnetic components according to an embodiment of the present disclosure.

Please refer to FIG. 7, which is a bottom view of the frame 104 and the magnetic components ME according to an embodiment of the present disclosure. As shown in FIG. 7, the four magnetic components ME are disposed in the grooves 1041 on the four corners of the frame 104. Because there is no another spring sheet disposed on the bottom of the frame 104 in the present disclosure, the widths of the four sides of the frame 104 can be reduced, and the volume of the frame 104 can be reduced, thereby achieving the purpose of miniaturization.

Furthermore, as shown in FIG. 7, the size of the groove 1041 is larger than the size of the magnetic component ME, so that the groove 1041 can include two glue slots 1045 on two sides of the magnetic component ME. Thus, when the magnetic components ME is mounted, more glue can be used to bond the frame 104 and the magnetic component ME to enhance the bonding strength between the frame 104 and the magnetic component ME. Secondly, glue can be accommodated in the glue slots 1045 without exceeding bottom surfaces of the frame 104 and the magnetic component ME so as to ensure that the bottom surfaces of the frame 104 and the magnetic component ME are flat.

Figure 8:
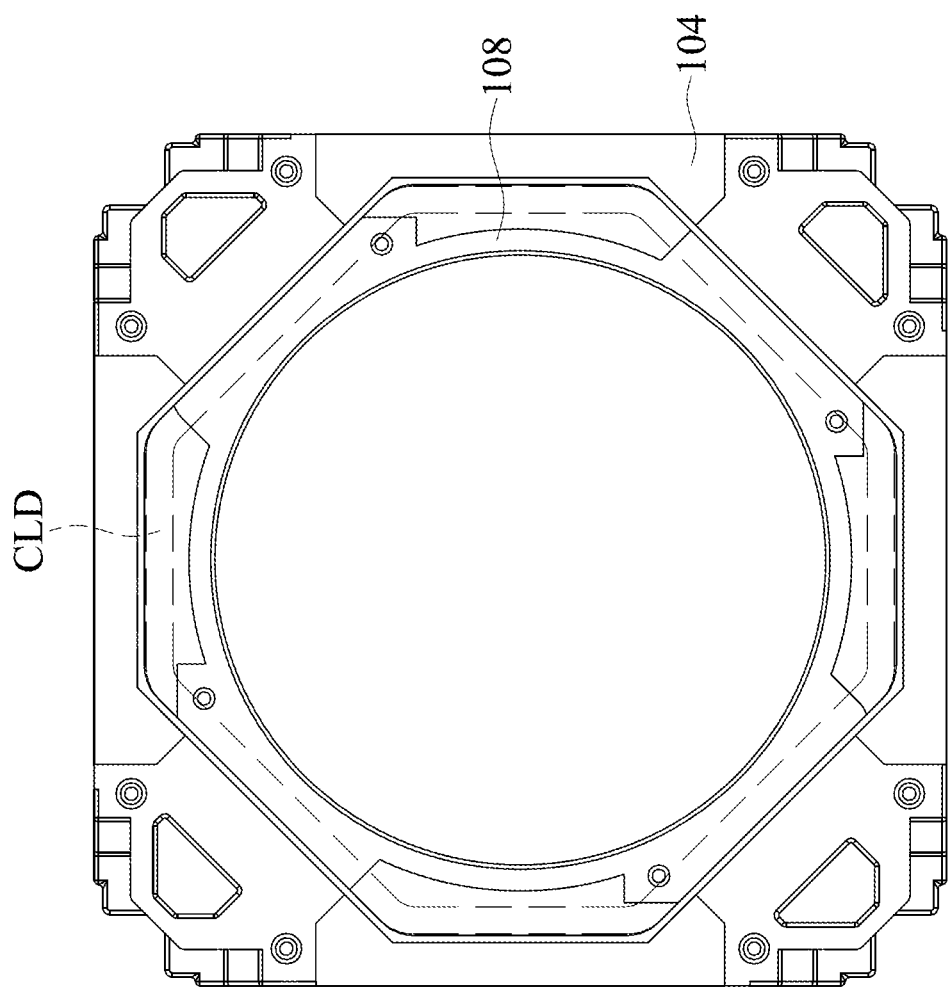
FIG. 8 is a top view of the frame and the holder according to an embodiment of the present disclosure.

Please refer to FIG. 2 and FIG. 8. FIG. 8 is a top view of the frame 104 and the holder 108 according to an embodiment of the present disclosure. The driving coil CLD is disposed in an annular groove 1083 of the holder 108 (FIG. 2) and does not protrude from the outer peripheral surface of the holder 108. In this way, the space occupied by the holder 108 can be reduced, and the distance between the holder 108 and the frame 104 can also be reduced, thereby reducing the overall volume of the optical component driving mechanism 100 for further miniaturization. Secondly, because the holder 108 is adjacent to the frame 104, the frame 104 can limit the rotation of the holder 108 and the displacement in the X direction or the Y direction of the holder 108, thereby improving the stability of the optical component driving mechanism 100.

Figure 9:
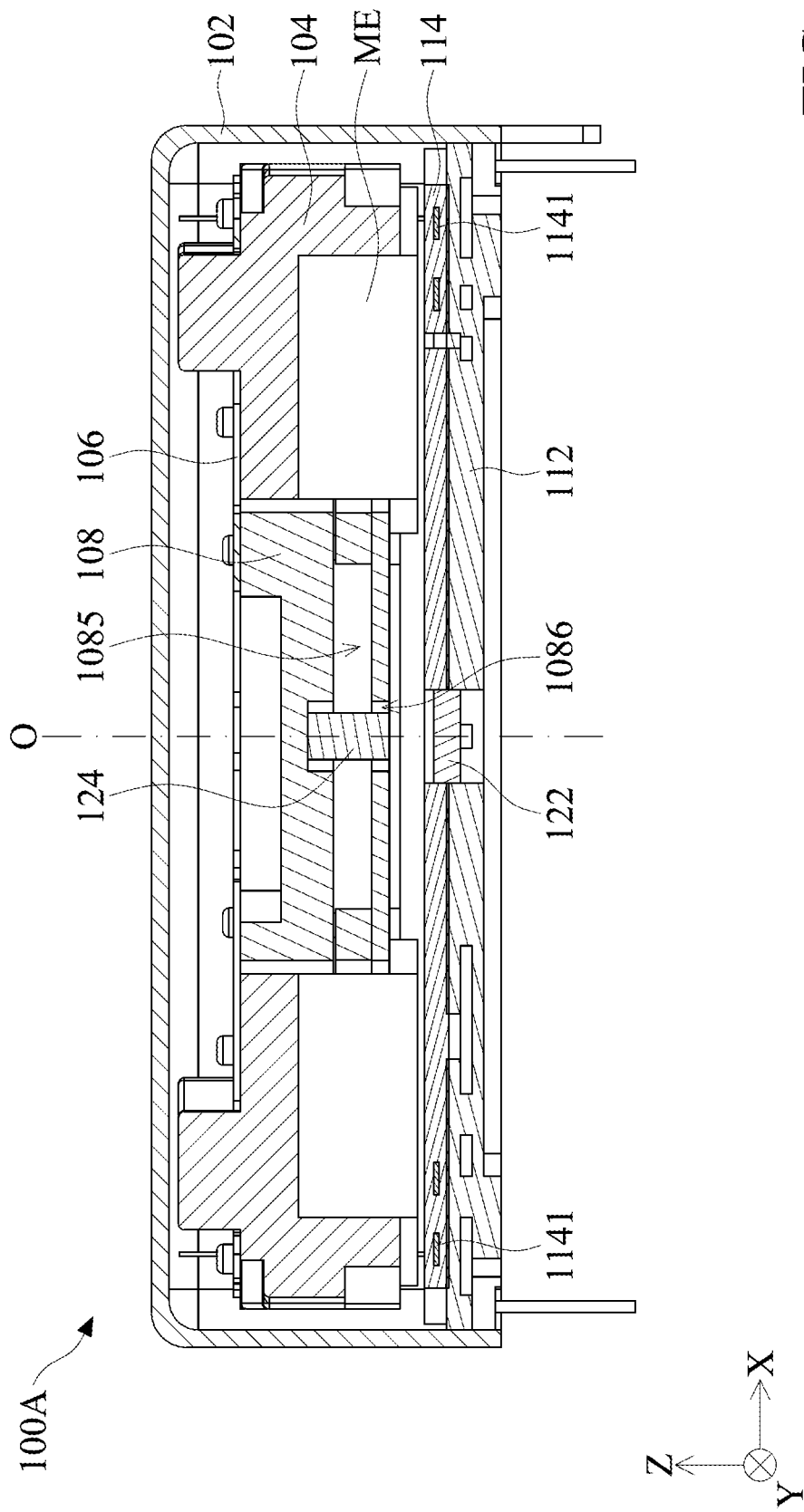
FIG. 9 is a cross-sectional view of an optical component driving mechanism according to another embodiment of the present disclosure.

Please refer to FIG. 9, which is a cross-sectional view of an optical component driving mechanism 100A according to another embodiment of the present disclosure. In compare to the previous embodiment, the optical component driving mechanism 100A of this embodiment further has a second sensing component 122 and a sensed component 124. The sensed component 124 is disposed in a receiving slot 1085 of the holder 108, and the second sensing component 122 is disposed on the base 112 corresponding to the sensed component 124. When the holder 108 moves along the optical axis O, the second sensing component 122 can sense the distance from the sensed component 124 so as to accurately control the movement of the holder 108.

Figure 10:
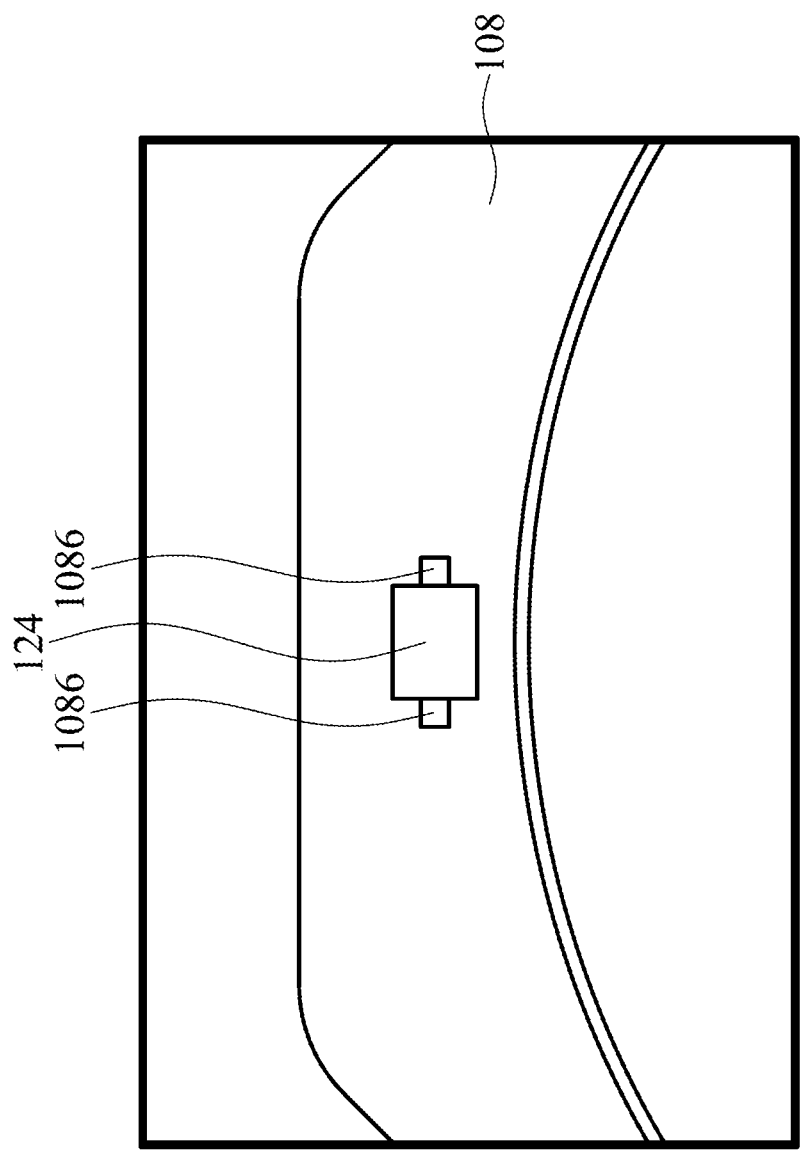
FIG. 10 is a bottom view of the holder of the optical component driving mechanism according to an embodiment of the present disclosure.

In addition, please refer to FIG. 9 and FIG. 10. FIG. 10 is a bottom view of the holder 108 of the optical component driving mechanism 100A according to an embodiment of the present disclosure. In this embodiment, the size of the receiving groove 1085 is larger than the sensed component 124, so that two sides of the sensed component 124 can form groove slots 1086. When the sensed component 124 is installed, more glue can be used to increase the bonding strength between the sensed component 124 and the holder 108. Secondly, glue is accommodated in the groove slots 1086 without exceeding bottom surfaces of the holder 108, so as to ensure that the bottom surface of the holder 108 is flat.

Figure 11:
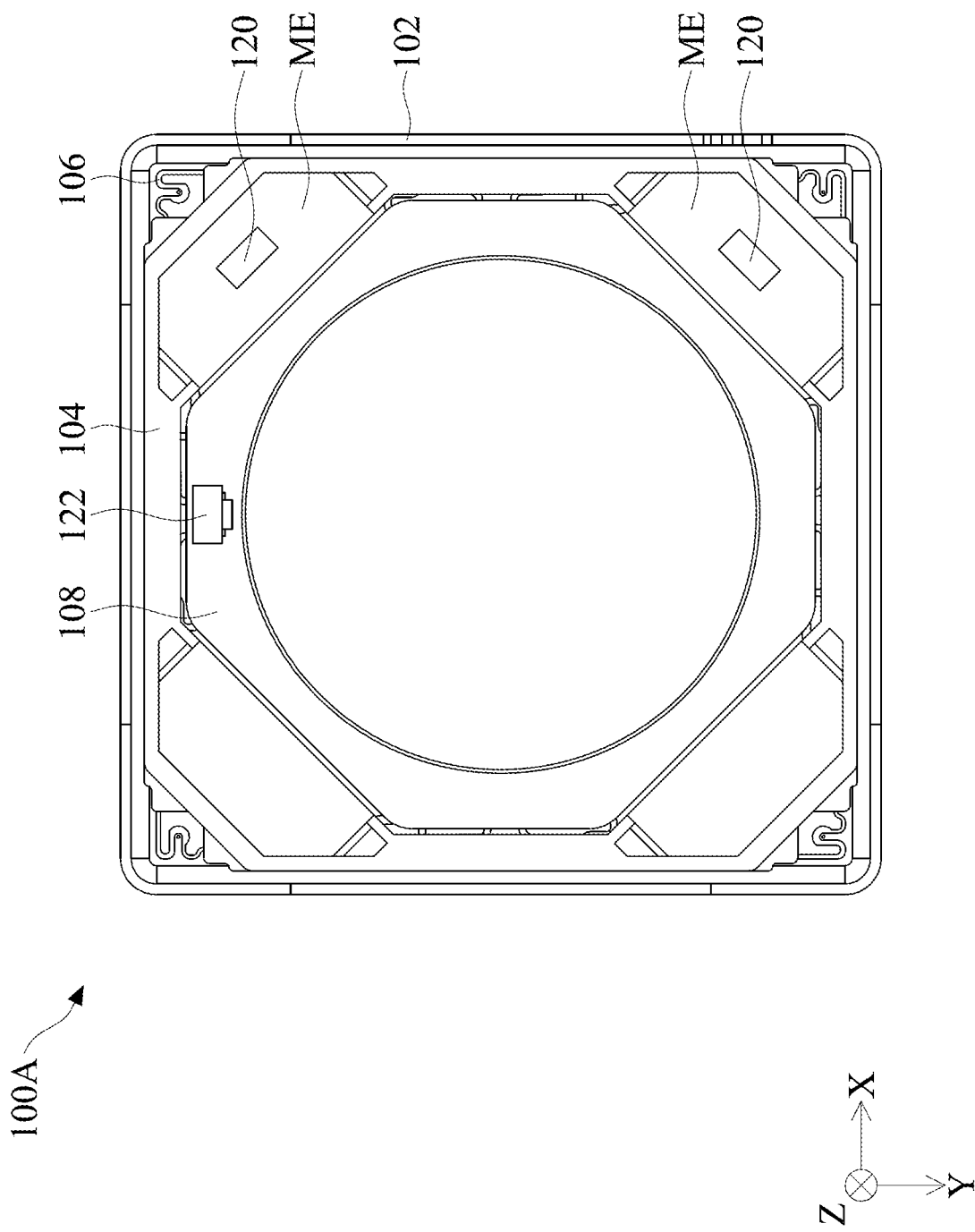
FIG. 11 is a bottom view of a partial structure of the optical component driving mechanism according to an embodiment of the present disclosure.

Please refer to FIG. 11, which is a bottom view of a partial structure of the optical component driving mechanism 100A according to an embodiment of the present disclosure. In this embodiment, the first sensing component 120 is disposed at the center of the corresponding magnetic component ME such that when there is a greater movement between the magnetic component ME and the first sensing component 120, the first sensing component 120 can still be placed within the range of the magnetic component ME to accurately sense the position of the magnetic component ME, thereby adjusting the position of the holder 108 in the X direction and the Y direction.

Figure 12:
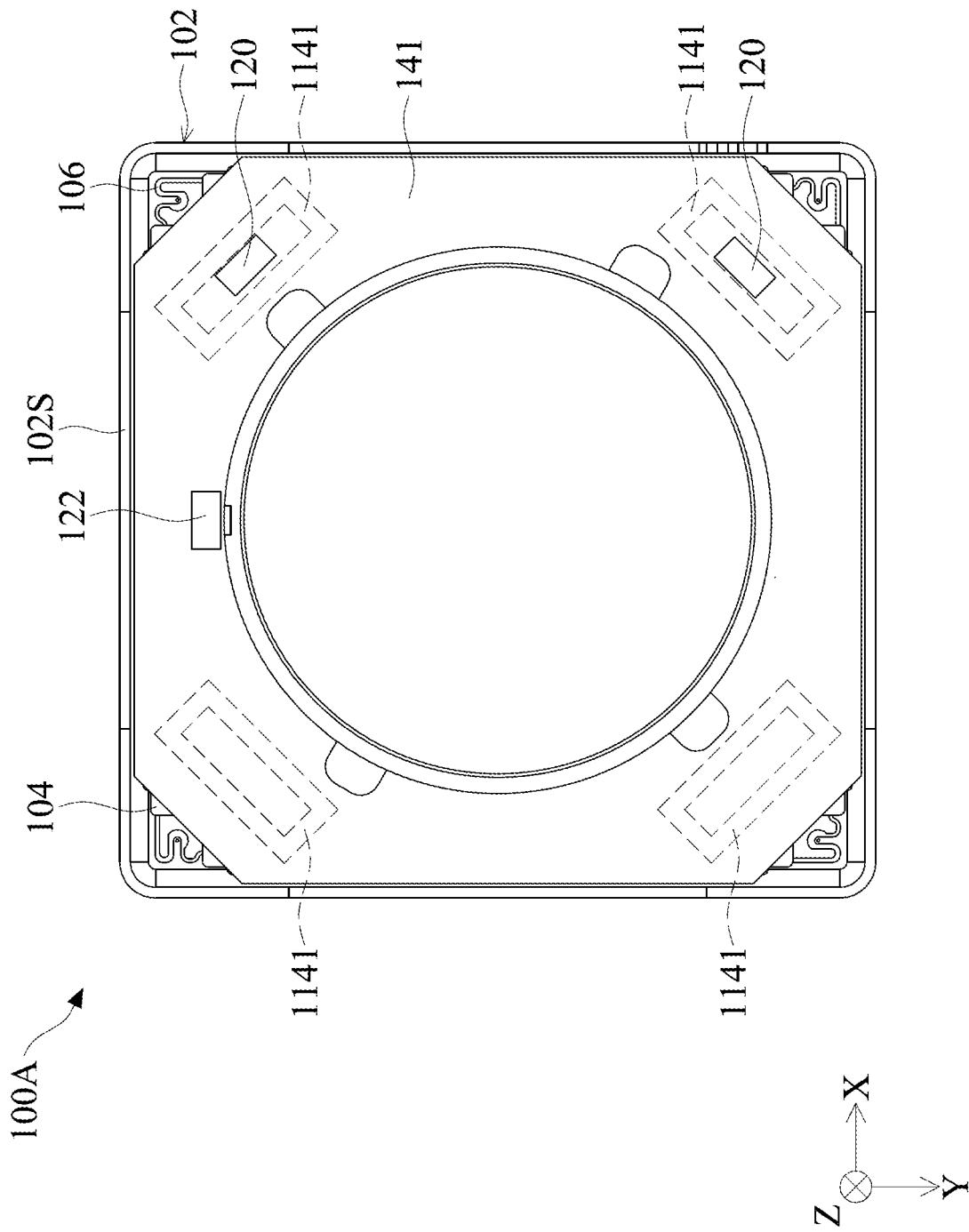
FIG. 12 is a bottom view of a partial structure of the optical component driving mechanism according to an embodiment of the present disclosure.

Please refer to FIG. 12, which is a bottom view of a partial structure of the optical component driving mechanism 100A according to an embodiment of the present disclosure. Because there is no another spring sheet disposed at the bottom of the frame 104 in the present disclosure, a larger area circuit board 114 (close to the side wall 102S of the casing 102) can be provided, thereby accommodating a larger induction coil 1141 (for example, the coverage area of the induction coil 1141 on the circuit board 114 is large). Thus, the electromagnetic force between the induction coil 1141 and the magnetic component ME can be increased so as to accurately drive the holder 108 to move along the X-Y plane.

Figure 13:
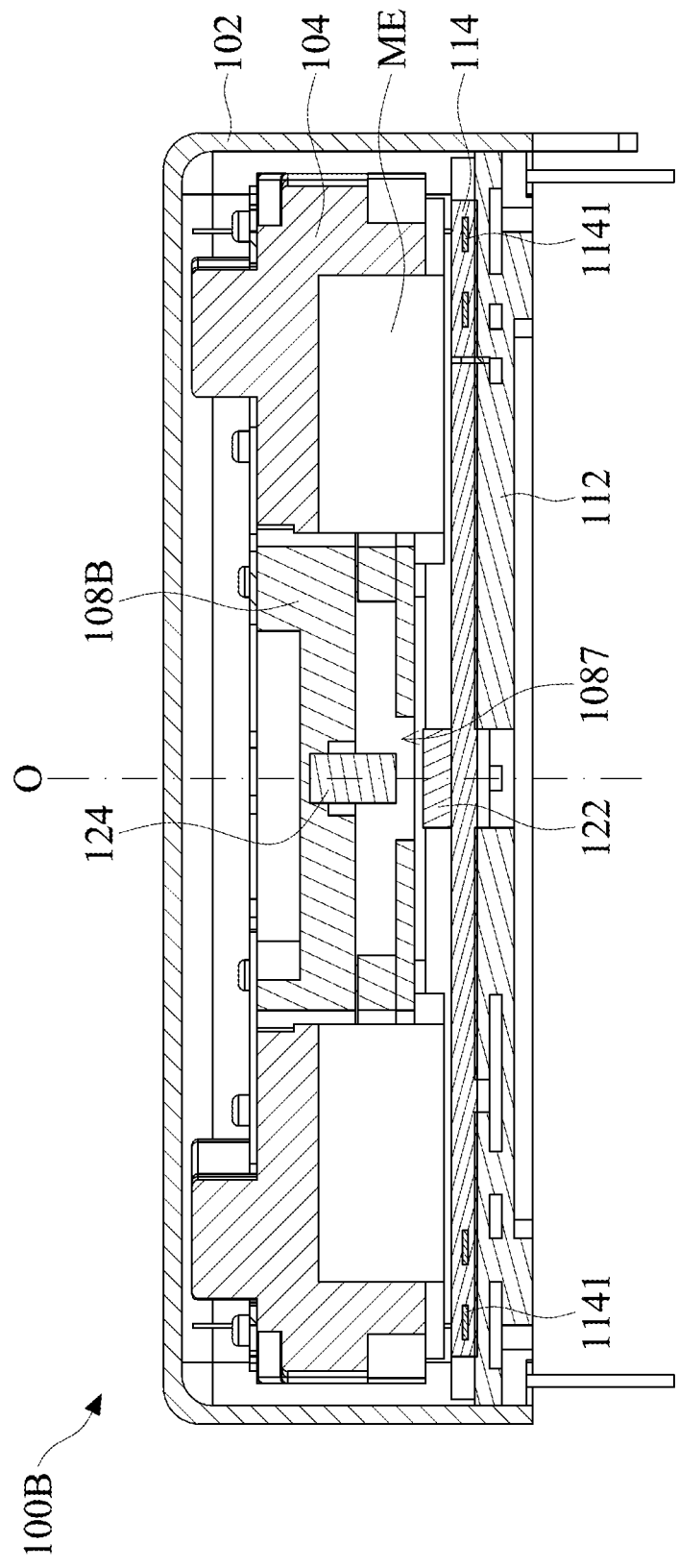
FIG. 13 is a cross-sectional view of an optical component driving mechanism according to another embodiment of the present disclosure.

Please refer to FIG. 13, which is a cross-sectional view of an optical component driving mechanism 100B according to another embodiment of the present disclosure. In this embodiment, a holder 108B has an opening 1087 for receiving the sensed component 124. When the holder 108B moves along the optical axis O, the second sensing component 122 disposed on the circuit board 114 can be received in the opening 1087 without colliding with the holder 108B.

Figure 14:
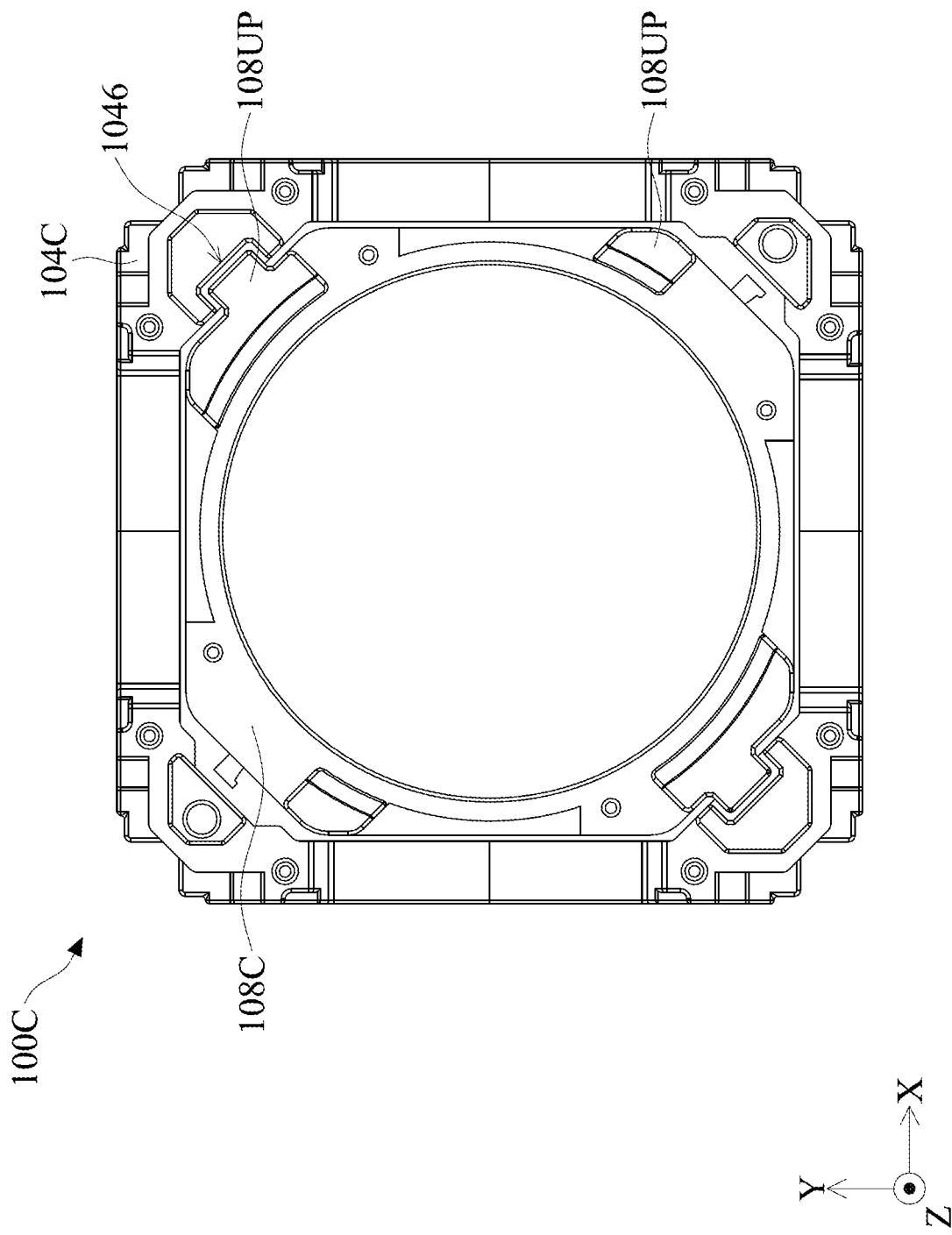
FIG. 14 is a top view of a partial structure of an optical component driving mechanism according to another embodiment of the present disclosure.
Figure 15:
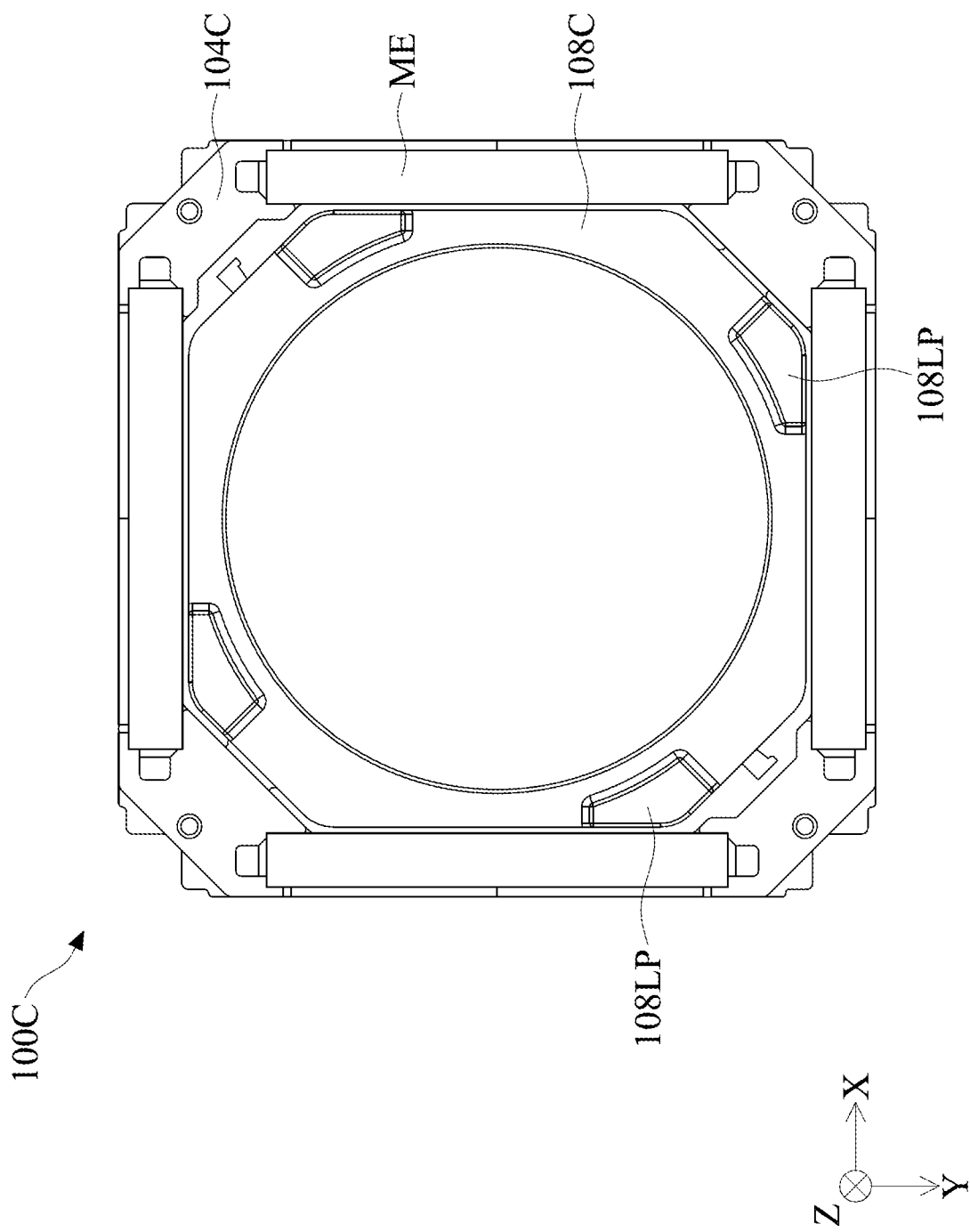
FIG. 15 is a bottom view of a partial structure of the optical component driving mechanism according to another embodiment of the present disclosure.

Please refer to FIG. 14 and FIG. 15. FIG. 14 is a top view of a partial structure of an optical component driving mechanism 1000 according to another embodiment of the present disclosure, and FIG. 15 is a bottom view of a partial structure of the optical component driving mechanism 100C according to another embodiment of the present disclosure. The optical component driving mechanism 100C is similar to the optical component driving mechanism 100 described above, and their difference is that, as shown in FIG. 15, each of the magnetic components ME has a long strip-shaped structure and the magnetic components ME are disposed on four sides of the frame 104C, and the thickness of four sides of the holder 108C along the X-axis direction and the Y-axis direction can be reduced. Therefore, even the magnetic components ME are disposed on the four sides of the frame 1040, the overall size of the optical component driving mechanism 100C can be reduced so as to achieve the purpose of miniaturization.

Furthermore, as shown in the figures, the top surface of the holder 108C in this embodiment has a plurality of limiting portions 108UP, and the bottom surface of the holder 108C has a plurality of limiting portions 108LP. The limiting portions 108UP and the limiting portions 108LP extend along the Z-axis direction and are configured to prevent the holder 108C from being damaged by collision when moving along the optical axis O. A portion of the limiting portion 108UP can be located in a recess portion 1046 of the frame 104C to limit the rotation of the holder 108C, thereby improving the stability of the optical component driving mechanism 100C.

Figure 16:
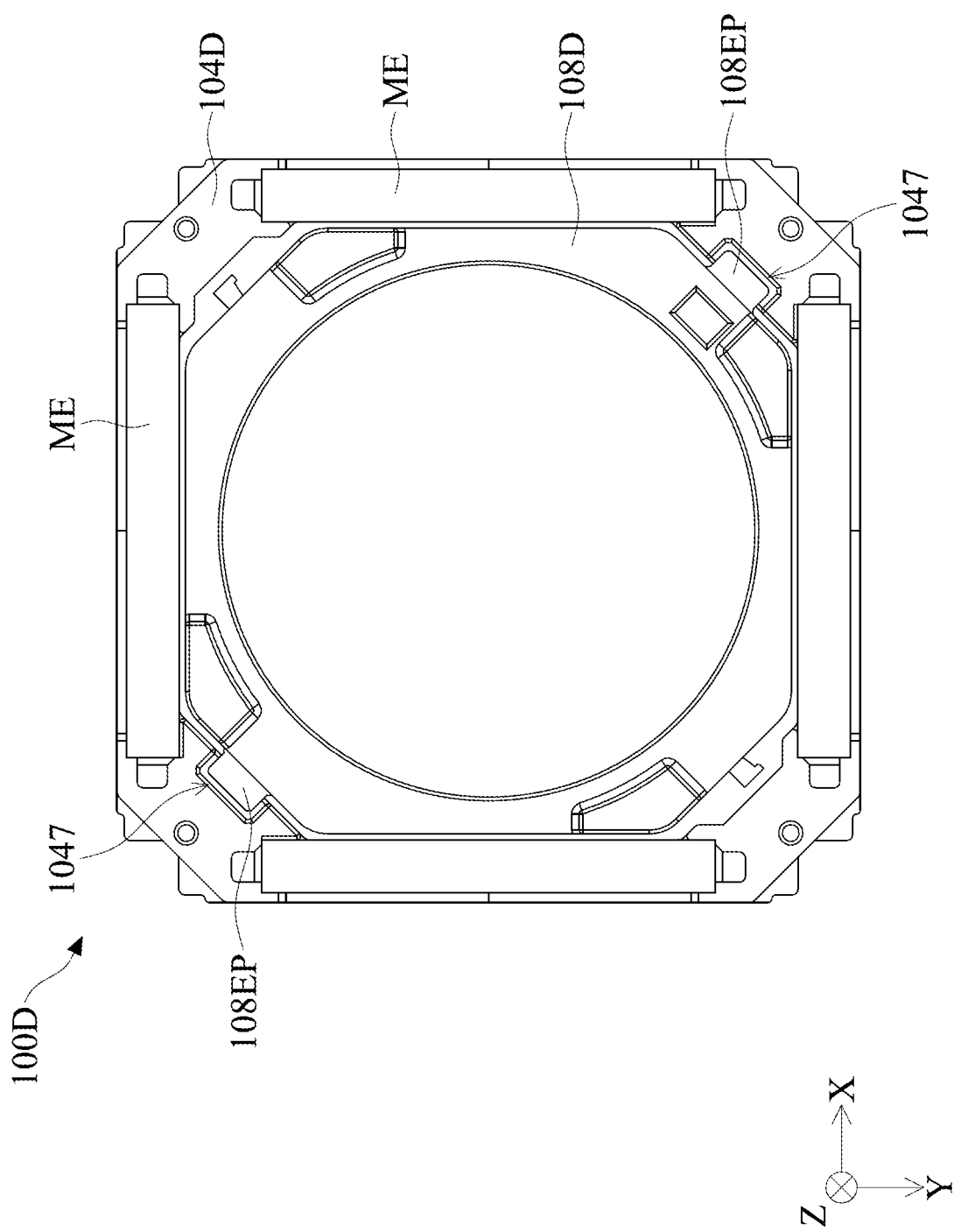
FIG. 16 is a bottom view of a partial structure of an optical component driving mechanism according to another embodiment of the present disclosure.

Please refer to FIG. 16, which is a bottom view of a partial structure of an optical component driving mechanism 100D according to another embodiment of the present disclosure. This embodiment is similar to the optical component driving mechanism 100C, and their difference is that an engaging portion 108EP is formed on each of two corners of the holder 108D in this embodiment, and the engaging portion 108EP extends to an engaging hole 1047 of the frame 104D so as to limit the rotation of the holder 108D.

The present disclosure provides an optical component driving mechanism configured to drive a holder and the optical component to move relative to the base, and the optical component driving mechanism has only a single spring sheet configured to connect the holder and the frame. Because the optical component driving mechanism only provide one single spring sheet, the overall height of the optical component driving mechanism can be reduced so as to achieve the purpose of miniaturization.

In addition, in some embodiments, the center of gravity of the spring sheet is closer to the center of gravity of the optical component, so that the stability of the optical component driving mechanism can be improved during operation. Furthermore, the spring sheet has a first elastic coefficient and a second elastic coefficient, and the second elastic coefficient is at least 20 times greater than the first elastic coefficient. Based on this structural design, the spring sheet can support the holder more effectively, and the spring sheet can be prevented from breaking, so as to ensure that the optical component driving mechanism can be operated normally.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical component driving mechanism, comprising:
a holder, configured to hold an optical component
a frame, elastically connected to the holder;
a casing, having a top wall and a side wall, wherein the side wall extends from the top wall along an optical axis of the optical component,
a base, fixedly connected to the casing;
a first elastic member, having a first outer connecting portion, a first inner connecting portion and a first elastic portion, wherein the first elastic portion is connected to the first outer connecting portion and the first inner connecting portion;
a second elastic member, having a second outer connecting portion, a second inner connecting portion and a second elastic portion, wherein the second elastic portion is connected to the second outer connecting portion and the second inner connecting portion; and
a driving assembly, configured to drive the holder to move relative to the frame, wherein the first elastic member is electrically independent from the second elastic members, the first and second outer connecting portions are disposed on the frame and face the top wall, the first and second inner connecting portions are disposed on the holder and face the top wall, and there is no elastic member disposed between the holder and the base for connecting the base or the frame;
wherein the optical component sequentially defines a first portion, a second portion, and a third portion with a same length along the optical axis, and when viewed in a direction perpendicular to the optical axis, the first elastic member and second elastic member partially overlap the second portion.

2. The optical component driving mechanism as claimed in claim 1, wherein the first elastic portion has a first elastic coefficient which is defined as a force required to cause deformation per unit length along a direction of the optical axis, and the second elastic portion has a second elastic coefficient which is defined as a force required to cause deformation per unit length along a direction perpendicular to the optical axis;
wherein the second elastic coefficient is at least 20 times greater than the first elastic coefficient.

3. The optical component driving mechanism as claimed in claim 1, wherein the optical component sequentially defines a first part, a second part, a third part, a fourth part and a fifth part with a same length along the optical axis, and when viewed along a direction perpendicular to the optical axis, the first elastic member and second elastic member partially overlap the third part.

4. The optical component driving mechanism as claimed in claim 1, wherein the driving assembly drives the holder to move along the optical axis.

5. The optical component driving mechanism as claimed in claim 1, wherein the first outer connecting portion and the second outer connecting portion are located on the same plane.

6. The optical component driving mechanism as claimed in claim 5, wherein the first inner connecting portion and the second inner connecting portion are located on the same plane.

7. The optical component driving mechanism as claimed in claim 6, wherein the first elastic portion and the second elastic portion each has a long strip-shaped structure, and a thickness of the first elastic portion or a thickness of the second elastic portion along the optical axis is greater than 0.04 mm.

8. The optical component driving mechanism as claimed in claim 7, wherein a width of the first elastic portion and a width of the second elastic portion is each greater than 0.048 mm.

9. The optical component driving mechanism as claimed in claim 1, wherein a total height of the optical component driving mechanism is less than 3 mm.

10. The optical component driving mechanism as claimed in claim 1, wherein the frame has a groove facing the base, and the groove is configured to receive a portion of the driving assembly.

11. The optical component driving mechanism as claimed in claim 1, wherein the first elastic portion and the second elastic portion partially overlap the frame when viewed along the optical axis.

12. The optical component driving mechanism as claimed in claim 11, wherein the frame has a plurality of avoiding grooves facing the top wall and corresponds to a portion of the first elastic portion and a portion of the second elastic portion.

13. The optical component driving mechanism as claimed in claim 12, wherein the avoiding grooves do not overlap the first outer connecting portion and the second outer connecting portion when viewed along the optical axis.

14. The optical component driving mechanism as claimed in claim 1, wherein the casing has a rectangular-shaped structure, the first elastic portion and the second elastic portion extend substantially parallel with the nearest portion of the side wall, and a length of the first elastic portion or a length of the second elastic portion is at least one third of a length of the side wall.

15. The optical component driving mechanism as claimed in claim 1, wherein the frame, the driving assembly and the holder face the base, and there is no flat elastic member between the base and the frame, between the base and the driving assembly and between the base and the holder.

16. The optical component driving mechanism as claimed in claim 1, wherein the holder has an opening, and the optical component driving mechanism further includes a sensing component corresponding to the opening, and the sensing component is received in the opening when the holder moves along the optical axis.

17. The optical component driving mechanism as claimed in claim 1, wherein a plurality of limiting portions is respectively formed on a top surface and a bottom surface of the holder and is extended along the optical axis.

18. The optical component driving mechanism as claimed in claim 17, wherein the frame has a recess portion, and a portion of the limiting portion on the top surface is located within the recess portion for limiting rotation of the holder.

19. An optical component driving mechanism, comprising:
- a holder, configured to hold an optical component
- a frame, elastically connected to the holder;
- a casing, having a top wall and a side wall, wherein the side wall extends from the top wall along an optical axis of the optical component,
- a base, fixedly connected to the casing;
- a first elastic member, having a first outer connecting portion, a first inner connecting portion and a first elastic portion, wherein the first elastic portion is connected to the first outer connecting portion and the first inner connecting portion;
- a second elastic member, having a second outer connecting portion, a second inner connecting portion and a second elastic portion, wherein the second elastic portion is connected to the second outer connecting portion and the second inner connecting portion; and
- a driving assembly, configured to drive the holder to move relative to the frame, wherein the first elastic member is electrically independent from the second elastic members, the first and second outer connecting portions are disposed on the frame and face the top wall, the first and second inner connecting portions are disposed on the holder and face the top wall, and there is no elastic member disposed between the holder and the base for connecting the base or the frame;
- wherein the holder defines an upper half portion and a lower half portion with a same height along the optical axis, and the driving assembly includes a driving coil disposed in the lower half portion, wherein the lower half portion is closer to the base than the upper half portion.

20. An optical component driving mechanism, comprising:
- a holder, configured to hold an optical component
- a frame, elastically connected to the holder;
- a casing, having a top wall and a side wall, wherein the side wall extends from the top wall along an optical axis of the optical component,
- a base, fixedly connected to the casing;
- a first elastic member, having a first outer connecting portion, a first inner connecting portion and a first elastic portion, wherein the first elastic portion is connected to the first outer connecting portion and the first inner connecting portion;
- a second elastic member, having a second outer connecting portion, a second inner connecting portion and a second elastic portion, wherein the second elastic portion is connected to the second outer connecting portion and the second inner connecting portion; and
- a driving assembly, configured to drive the holder to move relative to the frame, wherein the first elastic member is electrically independent from the second elastic members, the first and second outer connecting portions are disposed on the frame and face the top wall, the first and second inner connecting portions are disposed on the holder and face the top wall, and there is no elastic member disposed between the holder and the base for connecting the base or the frame;
- wherein the first elastic portion and the second elastic portion partially overlap the frame when viewed along the optical axis;
- wherein the frame has a plurality of avoiding grooves facing the top wall and corresponds to a portion of the first elastic portion and a portion of the second elastic portion.

* * * * *